P. KRUSE.
HORN EXTENSION SUPPORT.
APPLICATION FILED DEC. 19, 1918.
1,362,805. Patented Dec. 21, 1920.
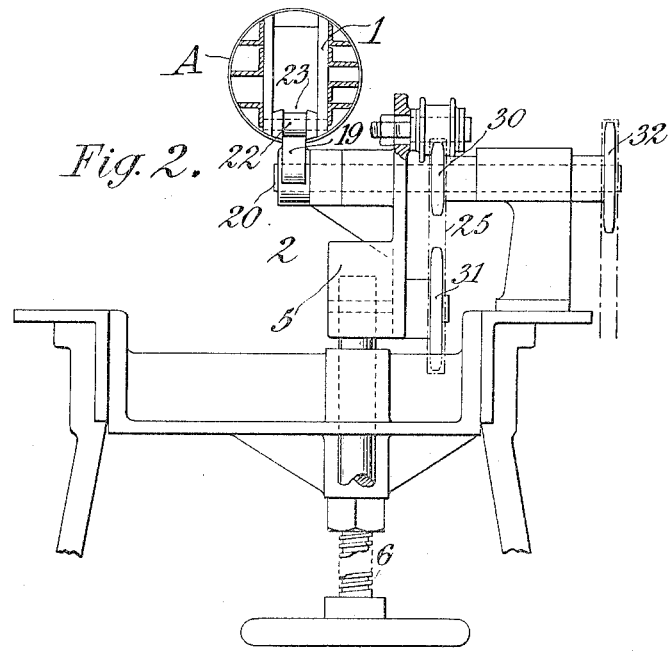
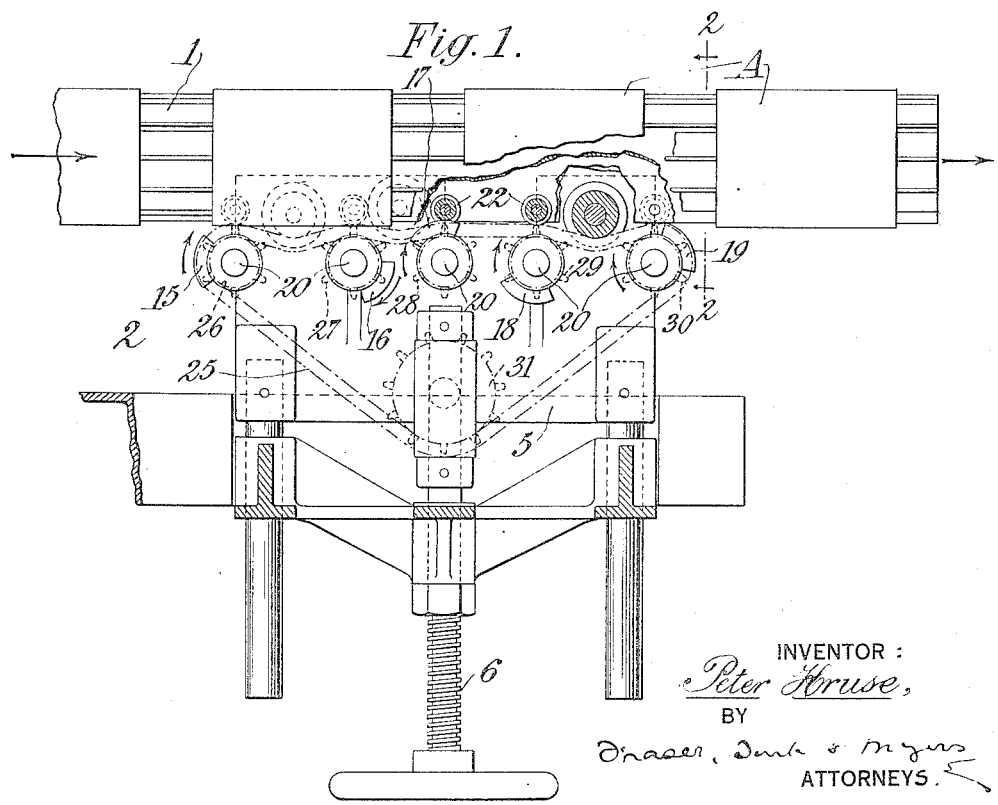
INVENTOR:
Peter Kruse,
BY
Fraser, ——— & Myers
ATTORNEYS.

UNITED STATES PATENT OFFICE.

PETER KRUSE, OF BROOKLYN, NEW YORK, ASSIGNOR TO E. W. BLISS COMPANY, OF BROOKLYN, NEW YORK, A CORPORATION OF WEST VIRGINIA.

HORN-EXTENSION SUPPORT.

1,362,805.     Specification of Letters Patent.     Patented Dec. 21, 1920.

Original application filed April 30, 1918, Serial No. 231,608. Divided and this application filed December 19, 1918. Serial No. 267,419.

*To all whom it may concern:*

Be it known that I, PETER KRUSE, a citizen of the United States of America, residing in the borough of Brooklyn, county of Kings, and State of New York, have invented certain new and useful Improvements in Horn-Extension Supports, of which the following is a specification.

This application is a division of my original application filed April 30, 1918, Serial No. 231,608.

The bodies of tin cans are now largely made upon a machine known as a body maker, and this machine (when the cans are to be of the sealed type) comprises a horn extension or solder-horn, onto which the tubular can bodies pass from the forming horn. The tubular can bodies pass along the solder horn, and while thereon have solder applied to the seam where the two ends of the body blank are joined.

Solder-horns, as usually made at the present time, are supported at or near the end where the can bodies pass off of the same, by a roller, the can bodies, as they move along the solder-horn, passing between the roller and the solder-horn. As each can body passes between the roller and solder-horn, there is a little bump or jar, due to the thickness of the tin of the can bodies.

There are, at the present time, machines upon which can bodies are formed at very nearly the rate of 200 cans per minute. In the very near future, it may be predicted, these machines will be operated at a speed of somewhat more than 200 bodies per minute. At such a rate of speed the bumps or shocks occasioned by the can bodies passing between the solder-horn and a roller support, become very considerable, and, in fact, objectionable, inasmuch as these bumps or jars are sufficient to detach or shake solder from the seam, and hence produce defective or leaky cans.

The present invention provides an improved mechanism or combination, wherein the solder-horn is supported in such manner that bumps or shocks are avoided as the can bodies pass the support for the solder-horn at or near its discharge end.

The invention also provides a mechanism of the character referred to, which is very simple in construction, and efficient in operation.

An embodiment of the invention is illustrated in the accompanying drawings.

In said drawings,—

Figure 1 is a side elevation of an embodiment of the invention, and

Fig. 2 is a sectional view on the line 2—2, Fig. 1.

Referring to said drawings, numeral 1 designates a horn extension or solder-horn of any suitable construction, this solder-horn being usually directly connected at its receiving end to the forming horn of a body maker.

A, A designate a series of tubular can bodies, which are advanced along the solder-horn in any suitable manner.

2 designates the solder-horn support.

The solder-horn support has portions which bear successively upon the solder-horn at various points longitudinally thereof, in such manner that the can bodies A may pass, without the can bodies being directly interposed between the solder-horn and the part of the solder-horn support which is acting to support the solder-horn.

As here shown, the support comprises a plurality of supporting projections 15, 16, 17, 18, 19. These projections are carried by a hub or hubs 20, here shown as a plurality of hubs mounted transversely of the solder-horn. Thus arranged, the frictional pull exerted by the supporting projections is longitudinally of the horn extension, or solder-horn. A single hub 20, however, carrying the projections 15, 16, 17, 18 and 19, could be mounted longitudinally of the solder-horn.

The solder-horn preferably has anti-friction rollers 22 with which the projections 15, 16, 17, 18 and 19 contact. These rollers may be grooved, as indicated at 23, so that the engagement of the parts 15, 16, 17, 18, 19, therein, prevent lateral displacement of the horn.

The hubs 20 are mounted in a bracket 5, which is adjustable vertically by means of a screw 6.

The hubs may be conveniently driven by a chain 25 passing over sprockets 26, 27, 28, 29 and 30, upon the hubs, and an idler sprocket 31. The chain may be driven by a sprocket 32 fixed to the shaft of one of the hubs or sprockets, as the hub and sprocket 26, 30.

The combined length or angularity of the projections 15, 16, 17, 18 and 19 is preferably somewhat in excess of 360°.

The hubs carrying the projections 15, 16, 17, 18 and 19 are driven at such a rate, and the projections are so disposed angularly upon the hubs, that they bear successively upon the solder-horn in the space between two can bodies as they are advanced along the solder-horn.

It will be seen that the mechanism acts to continuously support the solder-horn, and that bumps or shocks as the can bodies pass the solder-horn support, are avoided.

The invention may be embodied otherwise than as herein illustrated and specifically described.

What I claim is:—

1. A machine for making cans, comprising a solder-horn and means for supporting the same, said means comprising a plurality of rotary discontinuous segmental horn-contacting portions, said portions turning in a manner to have sliding contact with said horn.

2. A machine for making cans, comprising a solder-horn and means for supporting the same, said means comprising a plurality of rotary discontinuous segmental horn contacting portions adapted to make successive and collectively continuous contact with said horn.

3. A machine for making cans, comprising a solder-horn and means for supporting the same, said means comprising a plurality of rotary discontinuous segmental horn contacting portions adapted to make successive and collectively continuous contact with said horn, and means preventing lateral displacement of said horn on said supporting means.

4. A machine for making cans, comprising a solder-horn and means for supporting the same, said means comprising a plurality of rotary parts having arcuate horn-supporting portions, said parts having axes transverse of and fixed in relation to said horn.

5. A machine for making cans, comprising a solder-horn and means for supporting the same, said means comprising a plurality of rotary discontinuous horn-supporting portions and said supporting portions turning around an axis which occupies a fixed position as regards the horn, and anti-friction rollers on the horn with which said supporting portions contact, said rollers and supporting portions having means preventing lateral displacement of said horn.

6. A machine for making cans, comprising a solder-horn and means for supporting the same, said means comprising a plurality of parts intermittently contacting with said horn, means for actuating said parts so that one intermittently contacting part makes contact with said horn prior to the breaking of contact by another of said intermittently contacting parts, each part being located and arranged to contact with said horn at a part not touched during its period of contact by another contacting part.

In witness whereof I have hereunto signed my name.

PETER KRUSE.

Witnesses:
EDWIN B. PEET,
EDWARD C. REDHEAL.